(12) United States Patent
Mueller

(10) Patent No.: US 7,716,582 B2
(45) Date of Patent: May 11, 2010

(54) METHOD FOR DISPLAYING A HIERARCHICALLY STRUCTURE LIST AND ASSOCIATED DISPLAY UNIT

(75) Inventor: Guido Mueller, Quedlinburg (DE)

(73) Assignee: Robert Bosch GmbH, Stuttgart (DE)

( * ) Notice: Subject to any disclaimer, the term of this patent is extended or adjusted under 35 U.S.C. 154(b) by 1516 days.

(21) Appl. No.: 10/498,031

(22) PCT Filed: Oct. 19, 2002

(86) PCT No.: PCT/DE02/03950

§ 371 (c)(1),
(2), (4) Date: Jan. 11, 2005

(87) PCT Pub. No.: WO03/050420

PCT Pub. Date: Jun. 19, 2003

(65) Prior Publication Data

US 2005/0125147 A1    Jun. 9, 2005

(30) Foreign Application Priority Data

Dec. 7, 2001    (DE) ................. 101 60 261

(51) Int. Cl.
G06F 3/048    (2006.01)
G01C 21/30    (2006.01)

(52) U.S. Cl. .............. 715/713; 715/234; 715/273; 715/784; 701/209; 701/201

(58) Field of Classification Search ........... 715/200, 715/234, 251, 713, 723, 738, 739, 760, 841, 715/851, 853–855, 202, 203, 205, 243, 246, 715/273, 737, 784, 785, 786, 800, 802; 701/1, 701/2, 200, 201, 206, 207, 209
See application file for complete search history.

(56) References Cited

U.S. PATENT DOCUMENTS

| 5,812,135 | A |   | 9/1998 | Kotchey |
| 5,923,328 | A |   | 7/1999 | Griesmer |
| 5,953,017 | A |   | 9/1999 | Cragun et al. |
| 6,035,330 | A | * | 3/2000 | Astiz et al. ............... 709/218 |
| 6,104,316 | A | * | 8/2000 | Behr et al. ............ 340/995.12 |
| 6,202,023 | B1 | * | 3/2001 | Hancock et al. ............ 701/201 |
| 6,249,742 | B1 | * | 6/2001 | Friederich et al. .......... 701/202 |
| 6,295,502 | B1 | * | 9/2001 | Hancock et al. ............ 701/201 |
| 6,448,985 | B1 |   | 9/2002 | McNally |

(Continued)

OTHER PUBLICATIONS

Stockus et al., "Web-based Vehicle Localization," IEEE, Oct. 2000, pp. 436-441.*

(Continued)

Primary Examiner—Laurie Ries
Assistant Examiner—Maikhanh Nguyen
(74) Attorney, Agent, or Firm—Kenyon & Kenyon LLP

(57) ABSTRACT

A method is provided for displaying at least one hierarchically structured list having at least two levels, and a display unit for such a method is also provided, in which the user is offered an optimum overview in the display of hierarchically structured lists having at least two levels. In the display of one or more of the subordinate elements of the list, the respective superordinate element of the list associated with the subordinate element of the list is also always displayed.

17 Claims, 19 Drawing Sheets

U.S. PATENT DOCUMENTS

| | | | | |
|---|---|---|---|---|
| 6,854,088 | B2* | 2/2005 | Massengale et al. | 715/764 |
| 7,234,111 | B2* | 6/2007 | Chu et al. | 715/251 |
| 2001/0045965 | A1* | 11/2001 | Orbanes et al. | 345/841 |
| 2002/0126153 | A1* | 9/2002 | Withers et al. | 345/773 |
| 2003/0030666 | A1* | 2/2003 | Najmi et al. | 345/745 |
| 2003/0137541 | A1* | 7/2003 | Massengale et al. | 345/764 |
| 2004/0163046 | A1* | 8/2004 | Chu et al. | 715/517 |

OTHER PUBLICATIONS

Saffiotti et al., "Hierarchical Locative Reansoning for Autonomous Mobile Platforms," IEEE, Sep. 1995, pp. 202-207.*

K. Pu, "The Future of Wireless Application Development for a Connected Vehicle," IEEE, Oct. 1998, pp. 104-106.*

* cited by examiner

```
I in A
II in A
1
III / 1
2
2 in B
IV / 2 in B
V / 2 in B
VI / 2 in B
VI / 3 in B
VII / 3 in B
VIII / 4 in B
IX / 4 in B
4
X / 5
X / 5 in C
XI / 5 in C
5
XII in D
XIII in D
```

Fig.1

PRIOR ART

PRIOR ART  PRIOR ART

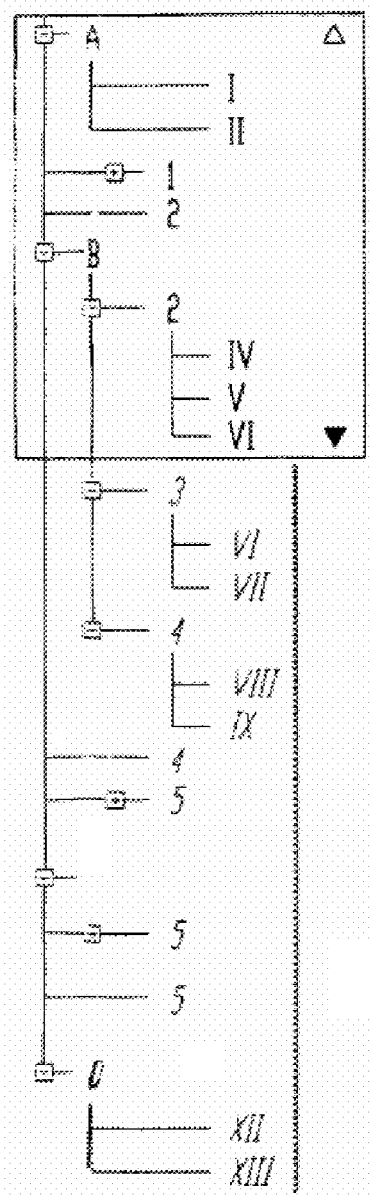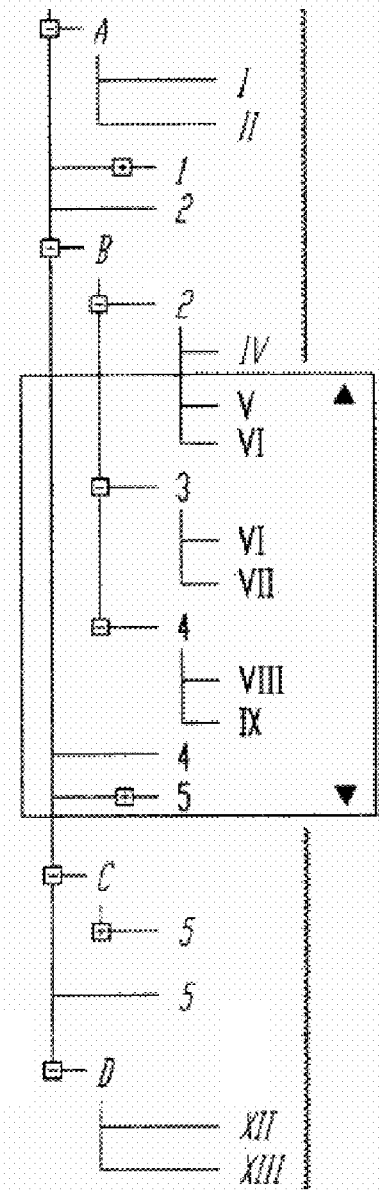
Fig.7A
PRIOR ART
Fig.7B
PRIOR ART

METHOD FOR DISPLAYING A HIERARCHICALLY STRUCTURE LIST AND ASSOCIATED DISPLAY UNIT

FIELD OF THE INVENTION

The present invention relates to a method for displaying at least one hierarchically structured list having at least two levels, which has at least one hierarchical level of superordinate entries or elements, and at least one hierarchical level of subordinate entries or elements, at least one subordinate element being associated with at least one superordinate element. The present invention further relates to a display unit for such a method.

BACKGROUND INFORMATION

The difficulty in displaying or representing long, hierarchically structured lists may be encountered nowadays in many technical fields, such as for the display of hierarchically structured lists on the display element of a computer system or on a navigation display. In this regard, a navigation system is used as an example below.

In a navigation system for displaying the results of a route search, a list of names of the streets included in the route may be generated. In addition to the actual street names (shown in Roman numerals in FIG. 1), the entries may also contain any existing street numbers (shown in Arabic numerals in FIG. 1) and the town (shown in capital letters in FIG. 1) to which the streets belong (see FIG. 1).

Although the "flat" or non-hierarchical display shown in FIG. 1 may be used in this form, it may be considered generally impracticable and not clear. For greater practicability and better clarity, entries and elements which are associated with a specific town (shown in capital letters in FIGS. 1 and 2) or a specific street number (shown in Arabic numerals in FIGS. 1 and 2) may be combined and hierarchically displayed, as illustrated in FIG. 2.

This form of the tree display shown as an example in FIG. 2 may offer the user greater practicability and better clarity, since the various entries and elements are displayed in a weighted manner according to their importance. It may also be possible to combine the partial lists created, also referred to below as "subordinate lists" or "sublists," and to display them using only the superordinate entry or the superordinate element.

Thus, for example, the streets within towns may be concealed so that the route list appears as a list of towns with overland road connections (see FIG. 3). Such a display may be practical, for example, for long cross-country trips for which the individual streets in the towns may be of no concern.

To show an existing possibility for expanding a concealed branch of the hierarchically structured list, a square with a plus sign has been established. Accordingly, a square with a minus sign is displayed for the existing possibility of collapsing a subordinate list or sublist. One such example is the route list displaying all towns and streets including street numbers, as shown in FIG. 4.

In addition to these various preset lists in which only certain portions are shown or concealed, other configurations may also be possible. Thus, after interaction with the user it may be possible to expand some sublists and to combine others (see FIG. 5).

The possibility of combining or collapsing sublists, or also expanding these sublists, is intended to help the user obtain a better overview of the information provided. This may be important since the display possibilities in navigation devices for an arrangement for transport, for example, may be limited by a small display. Thus, some conventional navigation devices, even those for a high-end arrangement for transport, may provide, for example, only six lines for displaying the list of street names.

Using an example of a display having ten lines, the hierarchically structured list and the corresponding display window are shown in FIGS. 6A and 6B. The entries and elements in boldface in FIGS. 6A and 6B appear in the display window, whereas the entries and elements in lighter typeface located outside the display window are used only for better understanding of the relationships, but are not visible to the user in the display window.

However, as seen from a comparison of FIGS. 7A and 7B, there may be an undesired feature for hierarchically structured lists, in that for specific regions it may not be possible to determine a direct association of the street name with the street number or with the town, or to determine a direct association of the street number with the town. This effect may appear, for example, in the middle of long subordinate lists.

In this case, the user may only obtain the sought information by scrolling through the hierarchically structured list. For very long lists this procedure may be undesired and impracticable because the actual entry or element of interest may be lost from the field of vision during scrolling. Thus, only in relatively few cases may it be possible to see the relevant entries and elements simultaneously. Thus, using FIG. 7B as an example, it is not possible to directly determine that street name IX belongs to town B. A direct association may therefore not always be possible, which may be perceived as unsatisfactory in light of the accompanying loss of information.

The display of hierarchically structured lists may generally be affected by this undesired feature when it is not possible to completely display these lists in the display medium (for the most part, it may not be possible to completely display hierarchically structured lists in the display medium; see FIG. 8A).

An example in the field of computer technology may include the display of file managers, such as for example in the case of Explorer in the Windows® operating system by Microsoft®. For such applications, it may not be possible in some cases for the user to, for example, determine what the superordinate directory, or even the superordinate directories of the files or directories instantaneously shown in the display window, are (see FIG. 8B).

SUMMARY OF THE INVENTION

The present invention provides an improved method of the aforementioned type, and a display unit related to such an improved example method, so that the user may be offered an optimum overview in the display of hierarchically structured lists having at least two levels.

In this regard, attention should be paid in particular to the problem of the display on display units, or displays having a limited number of lines. In contrast to the situation illustrated with reference to FIGS. 8A and 8B, the present invention may allow the user to appropriately associate the entries and elements on the hierarchically structured list with the respective superordinate entries and elements at all times.

The present invention may be characterized, for example, by the feature that for each element displayed, the associated superordinate entry—corresponding to a higher hierarchical level—is visible in the hierarchically structured list. The user may therefore obtain the overview at all times, even in large, hierarchically structured lists such as, for example, in the route list of a navigation system or in the directory tree of the file manager of an operating system.

In this connection, it may be useful that neither the present method nor the present display unit be limited to a specific number of hierarchical levels, but, rather, also suited for numerous applications having multiple hierarchical levels and a correspondingly high information content.

According to an example embodiment of the present invention, the entries and elements of subordinate lists—corresponding to a lower hierarchical level—may always be unambiguously associated with the superordinate elements, even when these lists are only partially displayed. In this regard, the user of the present invention may be aware, for example, that the entries and elements superordinate to the subordinate lists are always visible without further scrolling or shifting of the hierarchically structured list.

In the optimized display of long, hierarchically structured lists, the intent essentially is to display a specific important region. If this is a list having subordinate entries or elements (also referred to as subordinate list or sublist), the associated superordinate entries or elements should also be displayed.

To allow such an optimized display of the subordinate entries or elements simultaneously with the superordinate entries or elements, according to an example embodiment of the present invention the display region is subdivided into at least two in a sense virtual (display) regions, namely, the preferably higher-level (display) region for displaying the superordinate entries or elements (superordinate display region), and the preferably lower-level (display) region for displaying the sublists themselves, i.e., for displaying the entries or elements of the sublists (subordinate display region).

With regard to the structure of the display or representation of the hierarchically structured list, according to one example embodiment of the present invention the entries or elements to be displayed are first accepted into display lists before these entries or elements are then shown in the display. The display list of the subordinate entries or elements (list of entries or elements of the sublist or the subordinate display region) may, for example, be formed based on the last entry or element to be displayed to enable the required superordinate entries or elements to be determined.

For example, for each accepted entry or each accepted element of the sublist the superordinate entries or elements are accepted into the display list of the superordinate entries or elements (list of entries or elements in the superordinate display region). If an element is entered in the display list of subordinate entries or elements which is already contained in the display list of superordinate entries or elements, it may be useful to delete this element from the display list of the superordinate entries or elements.

In one example embodiment of the present invention, both lists, i.e., both the display list for the superordinate entries or elements and the display list for the subordinate entries or elements, are filled with entries or elements until the sum of the entries and elements in both lists is smaller than, or at a maximum, equal to, the number of usable lines.

After both the display list of the superordinate entries or elements and the display list of the subordinate entries or elements are appropriately filled, it may be useful for these display lists to be successively written into the display unit according to an example embodiment of the present invention, using conventional patterns. For the display of part of the superordinate entries or elements, an anomaly may be present when the next element to be displayed is not the subsequent element in the original list. In this case, the blanked out entries or elements must be identified. After the superordinate entries or elements are displayed, the display list of the subordinate entries or elements is displayed.

According to an example embodiment of the present invention, at least one separating element, in particular at least one separating line, is provided between the superordinate (display) region and the subordinate (display) region. The position of this separating element may not be static, but, rather, may result from the requirements of the upper display region provided by the superordinate entries or elements.

In other words, the separating element may be shifted so that in the superordinate display region it is possible to show all the superordinate elements associated with the subordinate elements; i.e., in the upper display region it is possible to show all superordinate entries or elements for the sublist(s) to be displayed.

In this connection it should be noted that for the entries or elements in the superordinate list, additional display space may be required for differentiating and/or separating the sublists. If the separating element, in the form of a separating line in one example embodiment, occupies one line, for example, both the display list for the superordinate entries or elements and the display list for the subordinate entries or elements may be filled with entries or elements only until the sum of the entries or elements of both lists is smaller—generally, smaller by one—than the number of usable lines.

One skilled in the art of displaying hierarchically structured lists may also be aware of the desired level of verifiability with regard to an example embodiment of the present invention, in that the verifiability may be present as a fundamental and required condition which may need to be fulfilled when the example method described here as well as the display unit described here are used.

In the optimized display of hierarchically structured lists of any given length, the at least one corresponding superordinate entry or element may be visible at any time for the displayed partial lists, also referred to as subordinate lists or sublists, according to an example embodiment of the present invention. In this connection, a required feature of the present example method is that portions of the beginning of the sublist(s) are blanked out to enable the superordinate entries or elements to be displayed.

In an example embodiment of the present invention, both the method and the present display unit may be suited, for example, for displaying hierarchically structured lists on a small display medium, such as the display of a cell phone or the display unit of a navigation system integrated into the instrument panel of a means of transport. In any case, the present example method may be used not only for displaying hierarchically structured lists, such as the list of street names in navigation systems, but also for displaying similar problem cases.

Lastly, the present invention relates to a use of the above-referenced example method in the display of the entries and/or elements of at least one in particular software-based route search application of a navigation system, including, for example, a navigation system installed in an arrangement for transport.

Alternatively or in addition thereto, the above-referenced example method may also be used for displaying the entries and/or elements of at least one file manager, including, for example, at least one display window of a file manager.

BRIEF DESCRIPTION OF THE DRAWINGS

FIG. 1 shows a simple, non-hierarchically structured list of street names.

FIG. 7A shows a display of a partially expanded list of street names in the display.

FIG. 7B shows the display from 7A with a display shifted downward compared to FIG. 7A.

DETAILED DESCRIPTION

An example method for displaying a list structured in three hierarchical levels may eliminate undesired features for the display of hierarchically structured lists having long sublists (subordinate lists, or lists having subordinate entries or elements). An example embodiment of the present invention ensures that the relevant pieces of information which are associated with one another, i.e., pertaining to one another, are simultaneously displayed.

In principle, in the display of long, hierarchically structured lists, a specific important region should essentially be displayed. If this involves a sublist, the associated subordinate entries and elements should also be displayed. To enable this, display region 10 according to the illustration in FIG. 9 is subdivided into two virtual (display) regions 12, 16, namely, superordinate display region 12 for displaying the superordinate entries and elements, and subordinate display region 16 which is provided for the entries and elements of the sublists themselves.

Figure 9:
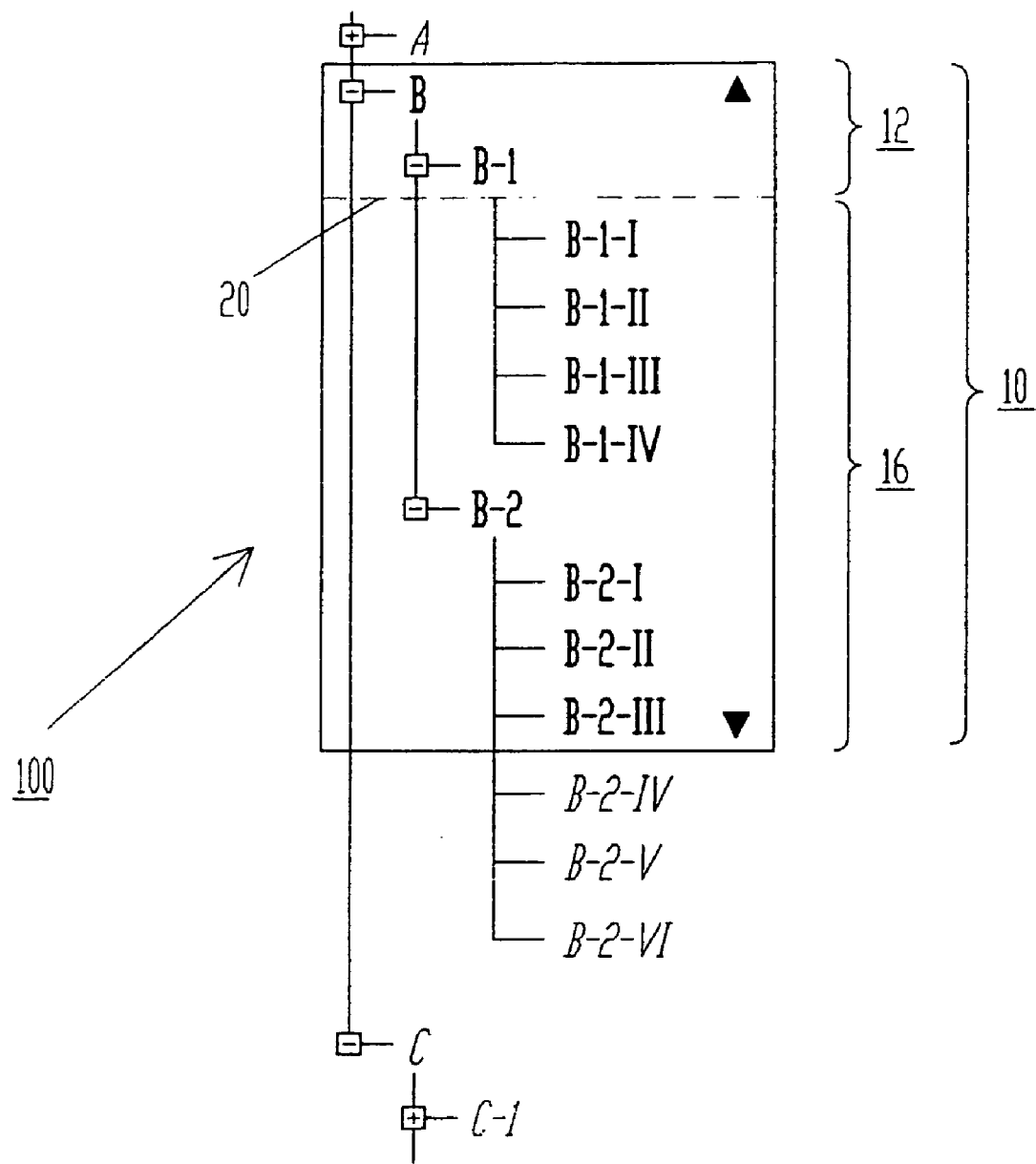
FIG. 9 shows the subdivision of the entire display region, achieved by a separating element, into a superordinate display region and a subordinate display region.

The position of a separating element in the form of a separating line 20 between superordinate display region 12 and subordinate display region 16 is not fixed or static on display unit 100, but, rather, results from the requirements of superordinate display region 12 in such a manner that it is required to display all superordinate entries and elements for the sublists to be displayed in subordinate display region 16 (see FIG. 9).

Figure 10:
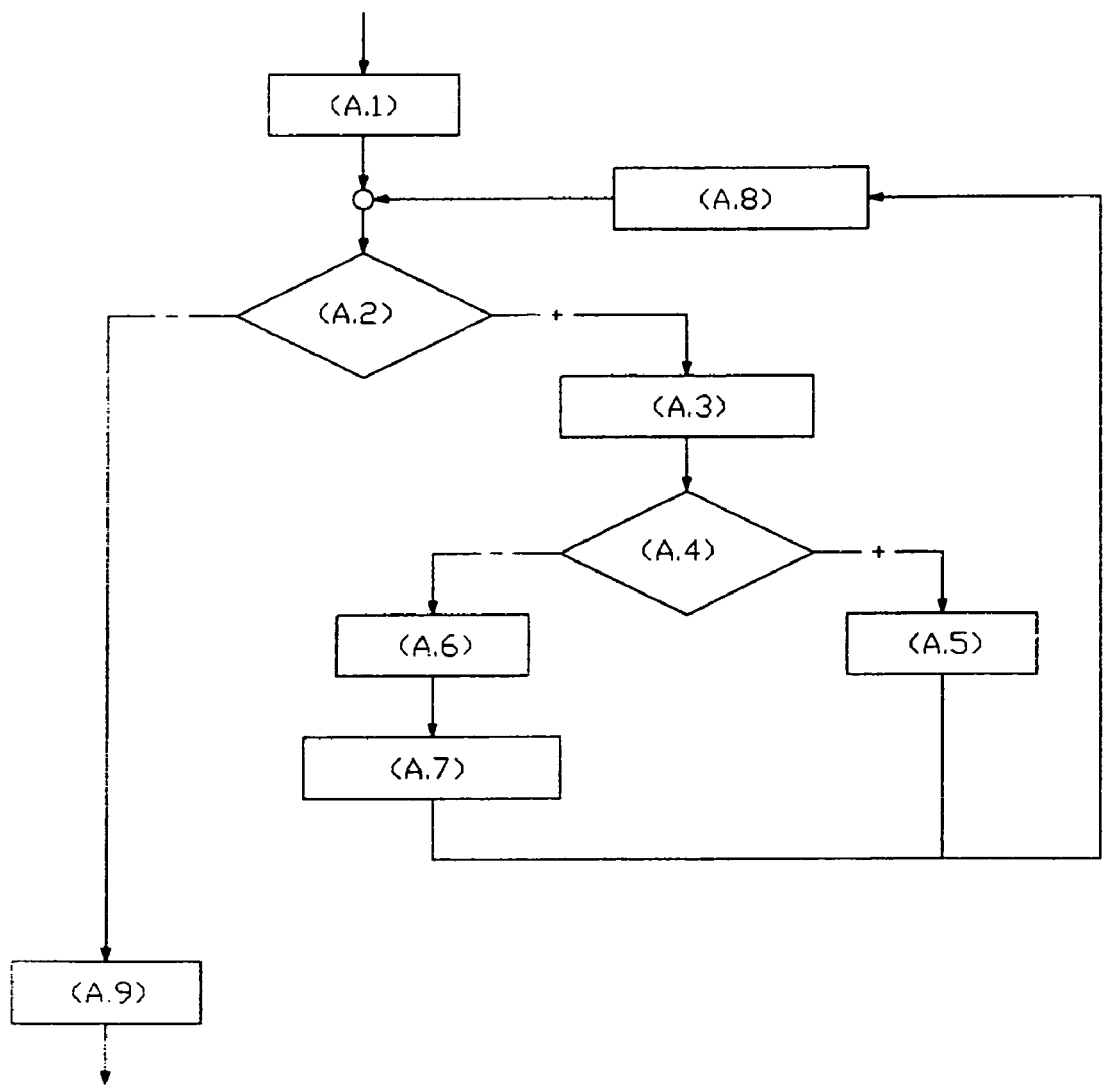
FIG. 10 shows a flowchart for the process of determining the entries and elements to be displayed.
Figure 11:
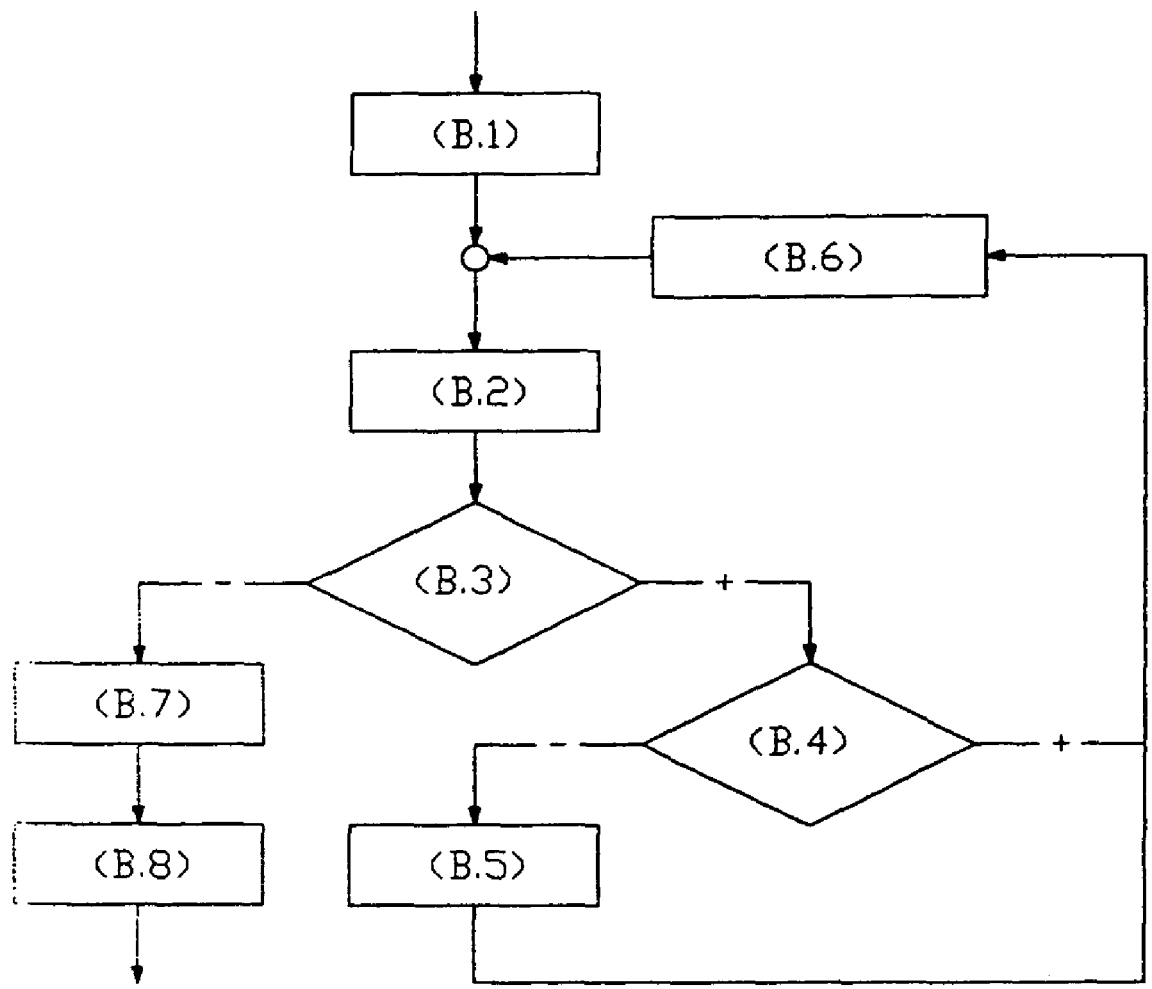
FIG. 11 shows a flowchart for the process of displaying the entries and elements to be displayed.

With respect to the algorithmic rules for forming the display in display unit 100, these algorithmic rules may be characterized, for example, by two exemplary method steps, namely, determination of the elements to be displayed (—>method steps [A.1] through [A.9] in FIG. 10) and display of the elements to be displayed (—>method steps [B.1] through [B.8] in FIG. 11).

First, the current element is defined as the last element to be displayed in the original list (=method step [A.1] in FIG. 10). Then a check is made as to whether an additional element may be accepted into subordinate display region 16 (=method step [A.2] in FIG. 10). If this is not the case (="–" in FIG. 10), then —clearly separated by separating line 20 according to FIG. 9 —superordinate display region 12 and subordinate display region 16 are displayed in display unit 100 (=method step [A.9] in FIG. 10).

On the other hand, if an additional element may be accepted into subordinate display region 16 (="+" in FIG. 10), this additional element is accepted as a current element into subordinate display region 16 (=method step [A.3] in FIG. 10). A check is subsequently made as to whether the current element is also contained in superordinate display region 12 (=method step [A.4] in FIG. 10). If this is the case (="+" in FIG. 10), the current element is deleted from superordinate display region 12 (=method step [A.5] in FIG. 10).

However, if the current element is not also contained in superordinate display region 12 (="–" in FIG. 10), the at least one superordinate element is specified as the current element (=method step [A.6] in FIG. 10), and the at least one superordinate element specified in method step [A.6] is accepted into superordinate display region 12 (=method step [A.7] in FIG. 10) if this superordinate element is not already contained in superordinate display region 12.

Subsequently, the current element is defined as the next element (viewed backward) to be displayed in the original list (=method step [A.8] in FIG. 10), and the procedure goes back to the point before method step [A.2]. Depending on the result of the checking procedure in method step [A.2], for a positive result (="+" in FIG. 10) cycle [A.2]->[A.3]->[A.4]->[A.5] or [A.6]->[A.7]->[A.8]->[A.2] begins again, whereas for a negative result (="−" in FIG. 10) from the checking procedure in method step [A.2], upper and lower display regions 12, 16, namely, superordinate display region 12 and subordinate display region 16, separated by separating element 20 are displayed.

For actually displaying the elements to be displayed, first the current element is then specified as the first element of superordinate display region 12 to be displayed (=method step [B.1] in FIG. 11) and is displayed (=method step [B.2] in FIG. 11). A check is then made as to whether an additional element of superordinate display region 12 to be displayed is present (method step [B.3] in FIG. 11). If this is not the case (="−" in FIG. 11), separating element 20 is displayed (=method step [B.7] in FIG. 11), and then subordinate display region 16 is also displayed (=method step [B.8] in FIG. 11).

On the other hand, if an additional element of superordinate display region 12 to be displayed is present (="+" in FIG. 11) in method step [B.3], a check is then made as to whether the subsequent element of superordinate display region 12 corresponds to the subsequent element of the original list (=method step [B.4] in FIG. 11).

If the subsequent element of superordinate display region 12 does not correspond to the subsequent element of the original list (="−" in FIG. 11), separating element 20 is then displayed (=method step [B.5] in FIG. 11). Otherwise, the current element is defined as the next element of superordinate display region 12 to be displayed (=method step [B.6] in FIG. 11), and the procedure goes back to the point before method step [B.2].

Depending on the result of the checking procedure in method step [B.3], for a positive result (="+" in FIG. 11) cycle [B.2]->[B.3]->[B.4]->[B.5]->[B.6]->[B.2] begins again, whereas for a negative result (="−" in FIG. 11) from the checking procedure in method step [B.3], both separating element 20 (=method step [B.7] in FIG. 11) and subordinate display region 16=method step [B.8] in FIG. 11) are displayed.

Figure 12:
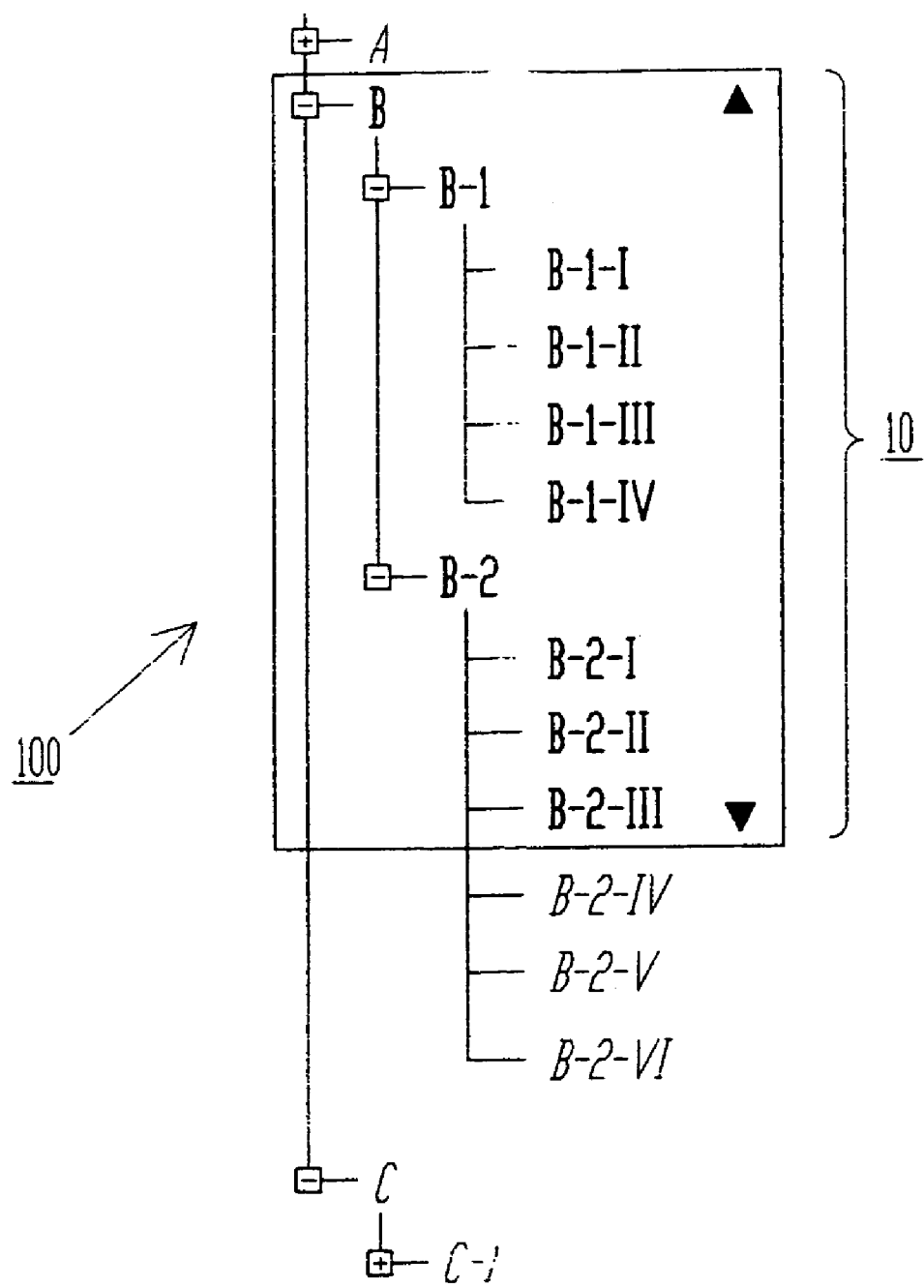
FIG. 12 shows the entire beginning of a sublist having the superordinate entries and elements in the still unscrolled starting situation.

With regard to the display of various hierarchically structured lists, it may be determined that the subdivision of display region 10 has actually occurred, if the hierarchically structured list in display region 10 is positioned so that the first element displayed is an element of the highest hierarchical level, and the respective superordinate entries and elements may be required to be identified for all displayed entries and elements of sublists (see FIG. 12).

Figures 13A, 13B:
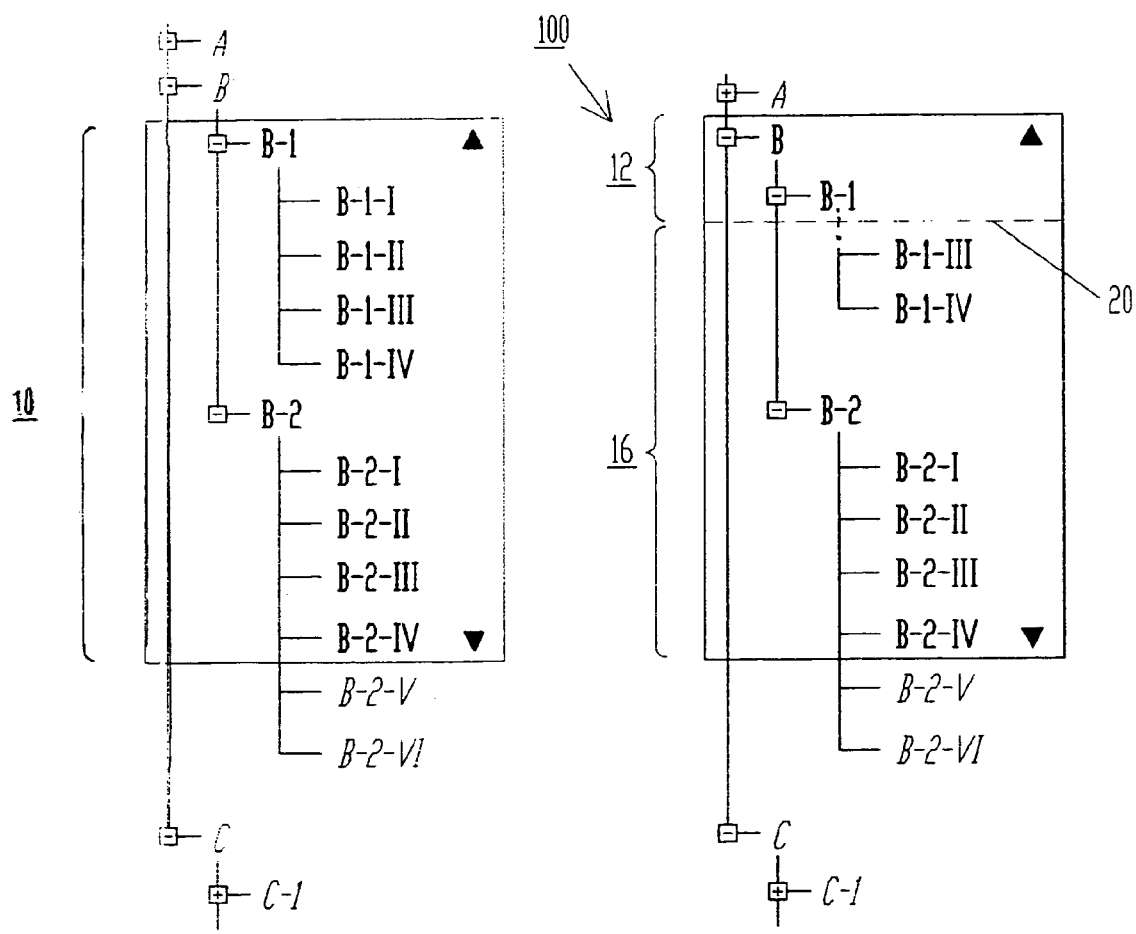
FIG. 13A shows the partially blanked out sublist from FIG. 12 having the superordinate elements after the first downward scroll.
FIG. 13B shows the partially blanked out sublist from FIG. 13A, scrolled downward by one additional element.
Figure 14A:
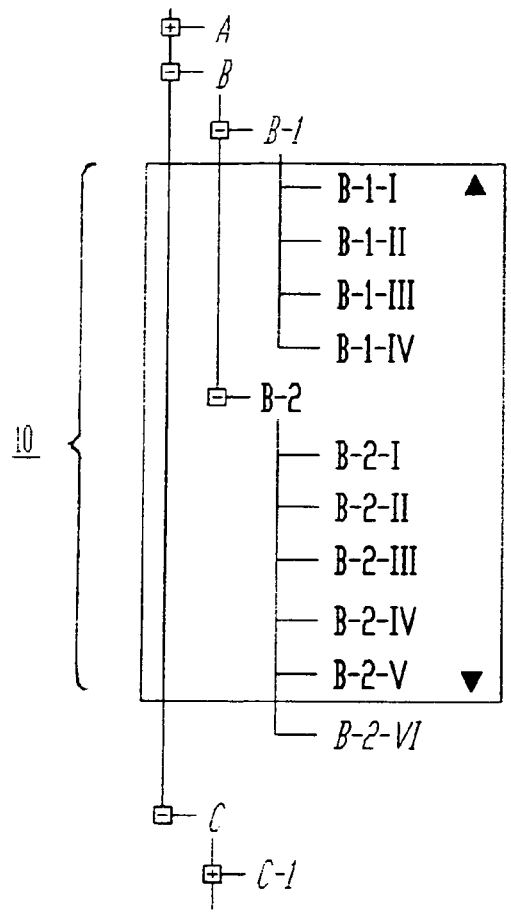
FIG. 14A shows the partially blanked out sublist from FIG. 12 having the superordinate elements after the second downward scroll.
Figure 14B:
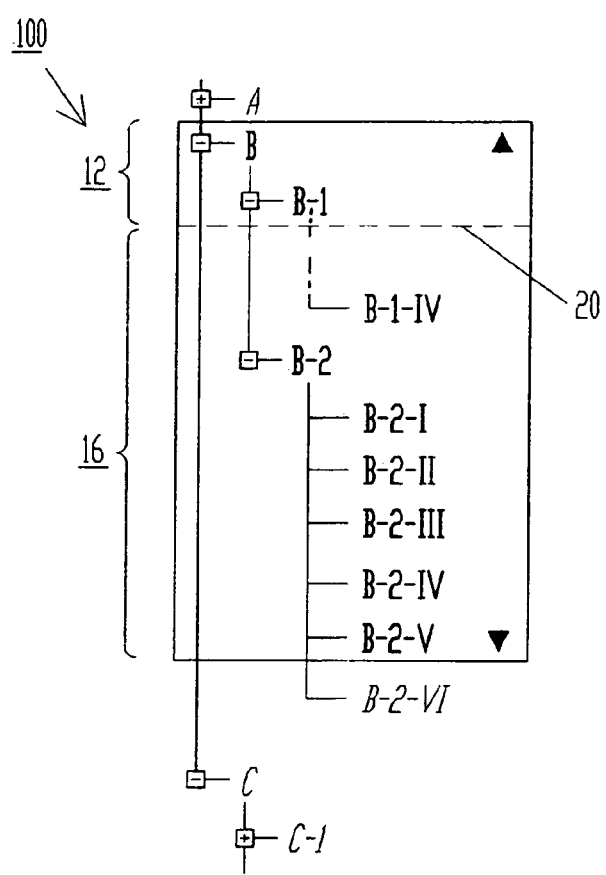
FIG. 14B shows the partially blanked out sublist from FIG. 14A having the superordinate element displayed for each element of the displayed sublist.
Figures 15A, 15B:
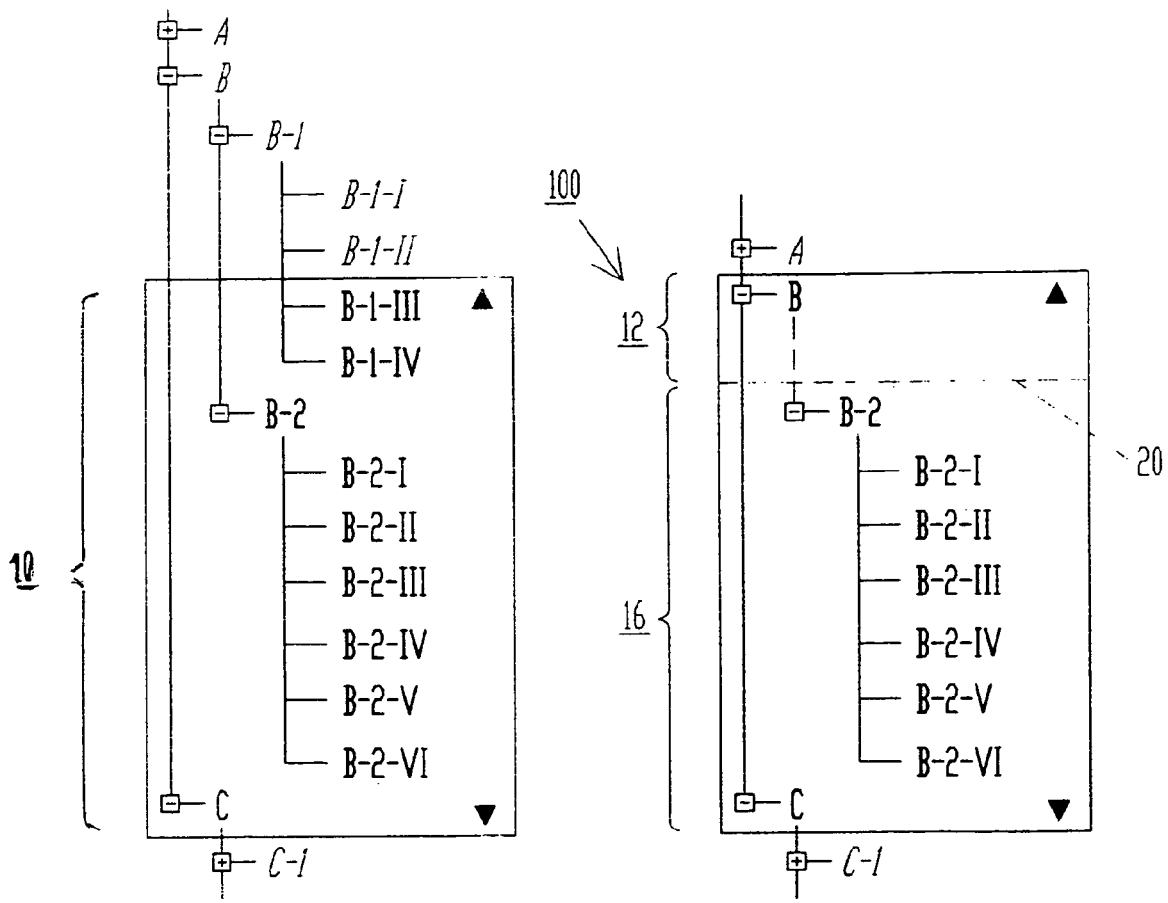
FIG. 15A shows the partially blanked out sublist from FIG. 12 having the superordinate elements after the fourth downward scroll.
FIG. 15B shows the partially blanked out sublist from FIG. 15A having the superordinate element displayed for each element of the displayed sublist.

By scrolling down through the hierarchically structured list (i.e., by shifting the entries and elements upward), the superordinate entries and elements drop out of display region 10 (see FIG. 13A). In this connection, according to FIGS. 9 through 20B, the user is signaled of the possibility of scrolling by a solid arrow on the right edge of display region 10.

Thus, with display unit 100 stationary, a solid arrow in the upper right corner of display region 10 indicates that the hierarchically structured list displayed may be shifted downward, so that entries and elements previously concealed now become visible in display region 10. Similarly, with display unit 100 stationary, a solid arrow in the lower right corner of display region 10 indicates that the hierarchically structured list displayed may be shifted upward, so that entries and elements previously concealed now become visible in display region 10.

The subdivision into two display regions 12, 16, i.e., into superordinate display region 12 and subordinate display region 16, is intended to prevent this effect of the superordinate entries and elements "dropping out" of display region 10. To this end, superordinate display region 12 is not affected by the shifting of the sublist, i.e., by the shifting in subordinate display region 16, in that in superordinate display region 12 the superordinate entries and elements—and only these—are collected and displayed according to their particular hierarchical level.

A separate display region, namely, subordinate display region 16, which in contrast to conventional displays may be diminished only by display region 12 for the superordinate entries and elements, is available for the sublist to be shifted. Consequently, scrolling down through the hierarchically structured list by one entry or by one element in the course of the optimized display of the hierarchically structured list results in a configuration according to FIG. 13B: for each element of the displayed sublist, the associated superordinate element is also displayed.

With the second downward scroll (see FIGS. 14A and 14B), display region 12 for the superordinate entries and elements remains the same, since all displayed entries and elements of the sublists are associated with these superordinate entries and elements, so that only the display for the sublists, i.e., the display in subordinate display region 16, is changed. In this regard according to FIG. 14B (after the second downward scroll), it may again be ensured that for each entry or each element of the displayed sublist the respective superordinate entry or superordinate element is also displayed in display unit 100.

With the next, i.e., the third downward scroll (see FIG. 15A), it may no longer be possible to display the sublist (corresponding to the third or lower hierarchical level) for element "B-1" (corresponding to the second or middle hierarchical level). Thus, associated superordinate element "B-1" (corresponding to the second or middle hierarchical level) itself is no longer permitted to be displayed as well, and is removed from upper superordinate display region 12 (see FIG. 15B).

However, element "B-2" (corresponding to the second or middle hierarchical level) also belongs to the sublist for superordinate element "B" (corresponding to the first or upper hierarchical level), so that in display region 16 for the sublists as well, element "B-2" is at the top of the associated list containing elements "B-2-I", "B-2-II", "B-2-III", "B-2-IV", "B-2-V", and "B-2-VI" (corresponding to the third or lower hierarchical level).

Thus, for each element "B-2-I", "B-2-II", "B-2-III", "B-2-IV", "B-2-V", and "B-2-VI" (corresponding to the third or lower hierarchical level) of the sublist, respective superordinate elements "B" (corresponding to the first or upper hierarchical level) and "B-2" (corresponding to the second or middle hierarchical level) are recognizable.

With the next, i.e., the fourth downward scroll (see FIG. 16A), there is an anomaly in that element "B-2" is not allowed to appear along with its superordinate element "B" in display region 12 for the superordinate elements, since list elements "B-1-I", "B-1-II", "B-1-III", and "B-1-IV" are not displayed before this list element. Thus, element "B-2" should be displayed in an additional display region 14 for superordinate entries and elements to ensure the assignment of elements to the sublist (see FIG. 16B).

Figures 16A, 16B:
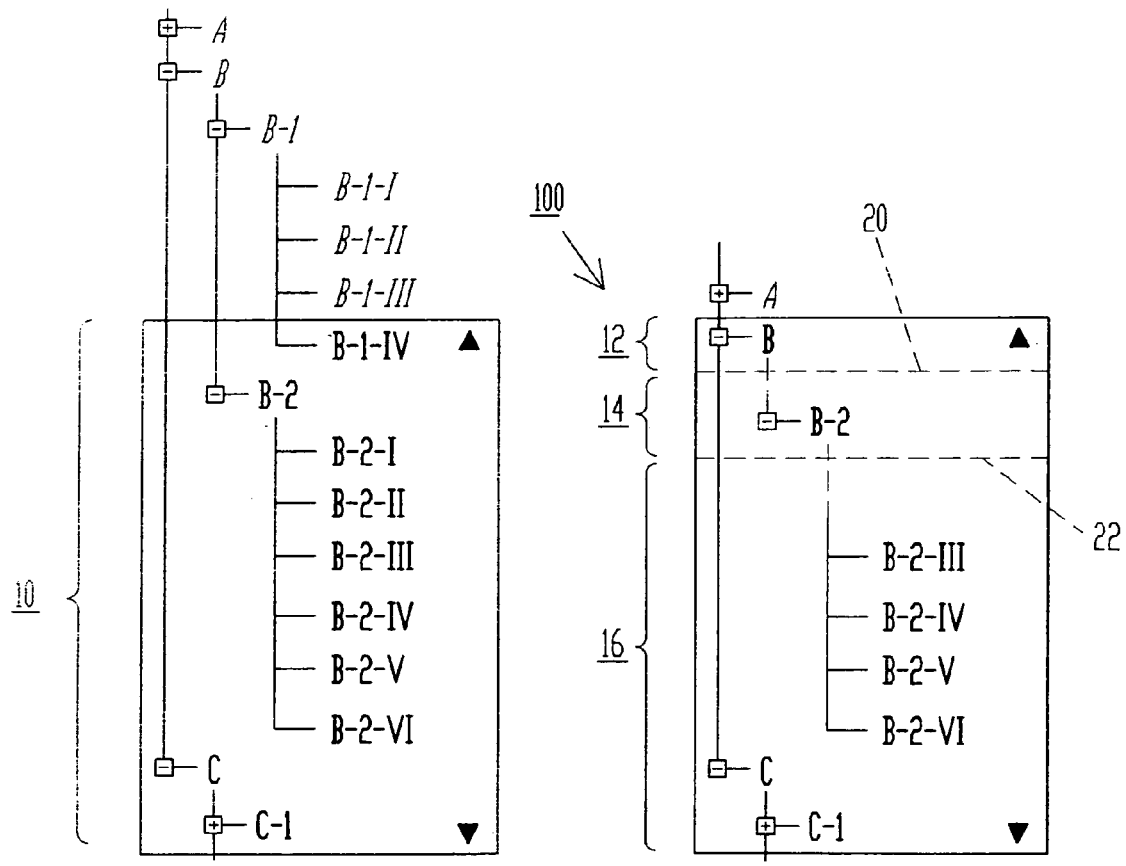
FIG. 16A shows the partially blanked out sublist from FIG. 12 having the superordinate elements after the fifth downward scroll.
FIG. 16B shows the partially blanked out sublist from FIG. 12 having the superordinate element displayed for each element of the displayed sublist.

An additional separating element in the form of an additional separating line 22 is provided between this additional superordinate display region 14 and subordinate display region 16, so that additional display region 14 is enclosed in a sense by first separating line 20 and second separating line 22 (see FIG. 16B).

Figures 17A, 17B:
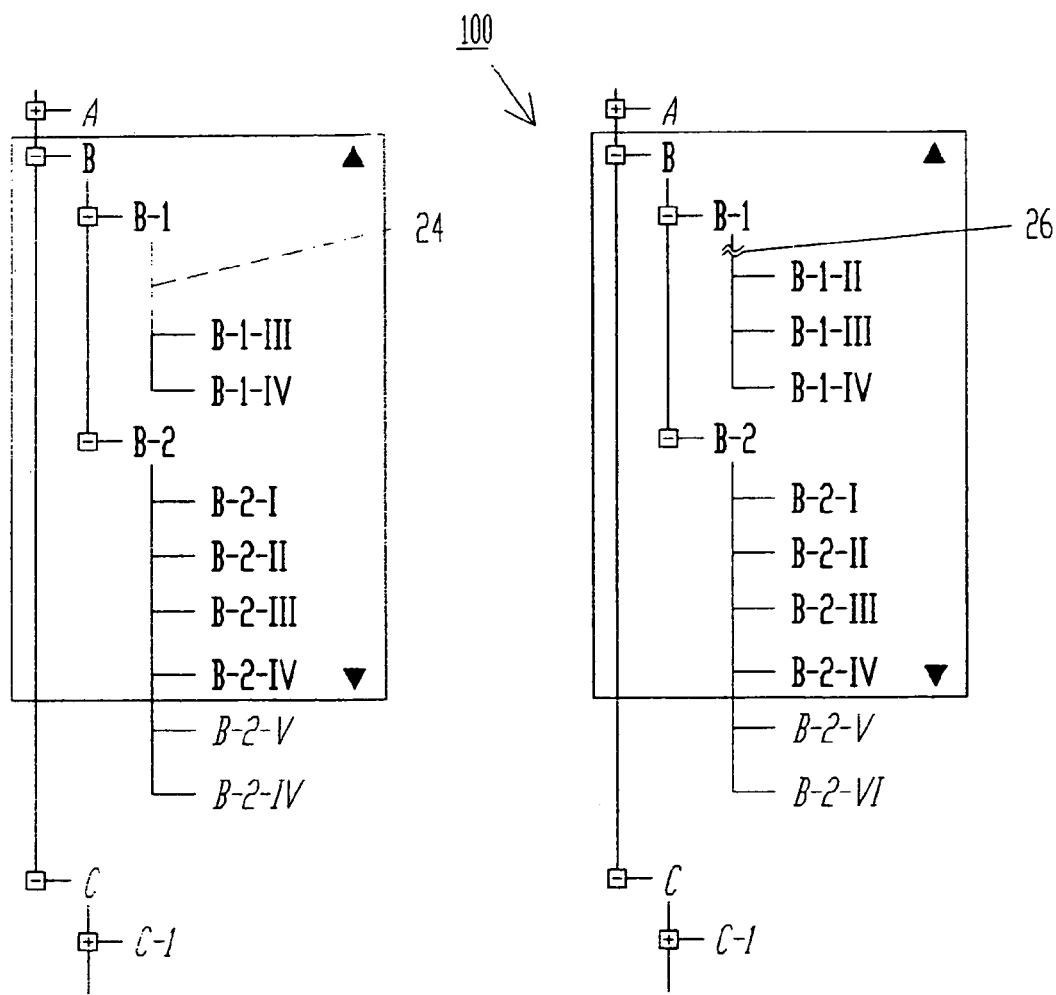
FIG. 17A shows the partially blanked out sublist from FIG. 12 having the superordinate elements after the fifth downward scroll.
FIG. 17B shows the partially blanked out sublist from FIG. 17A having the superordinate element displayed for each element of the displayed sublist.

For the configuration according to FIGS. 16A and 16B, it may be clear that in order to display the separation of display regions 12, 14, 16, an effective display which is as small and compact as possible should be found so that entire available display region 10 is not "used up" just for the superordinate elements, i.e., for superordinate display region 12. Two variants are shown in FIGS. 17A and 17B, namely, according to FIG. 17A a variant having interruption points 24 as separating and/or blanking elements, and according to FIG. 17B a variant having interruption lines 26 as separating and/or blanking elements.

Both interruption points 24 and interruption lines 26 identify for the user of display unit 100 that the entries and elements located in between are blanked out, so that the subordinate entries or elements do not use up all the available space in display unit 100. Thus, in superordinate display regions 12, 14 (see FIG. 16B) all the superordinate elements associated with the subordinate elements may be displayed; i.e., all superordinate elements for the sublists to be displayed may be displayed in upper display regions 12, 14.

According to an example embodiment of the present invention, a slightly smaller type(face) may be used in display regions 12, 14 for superordinate elements to allow the greatest possible number of hierarchical levels to be displayed. In the unfavorable case, it may be required to take into account that a separate display region 12, 14 for superordinate elements be set up for each of the three hierarchical levels in the embodiment.

Figure 2:
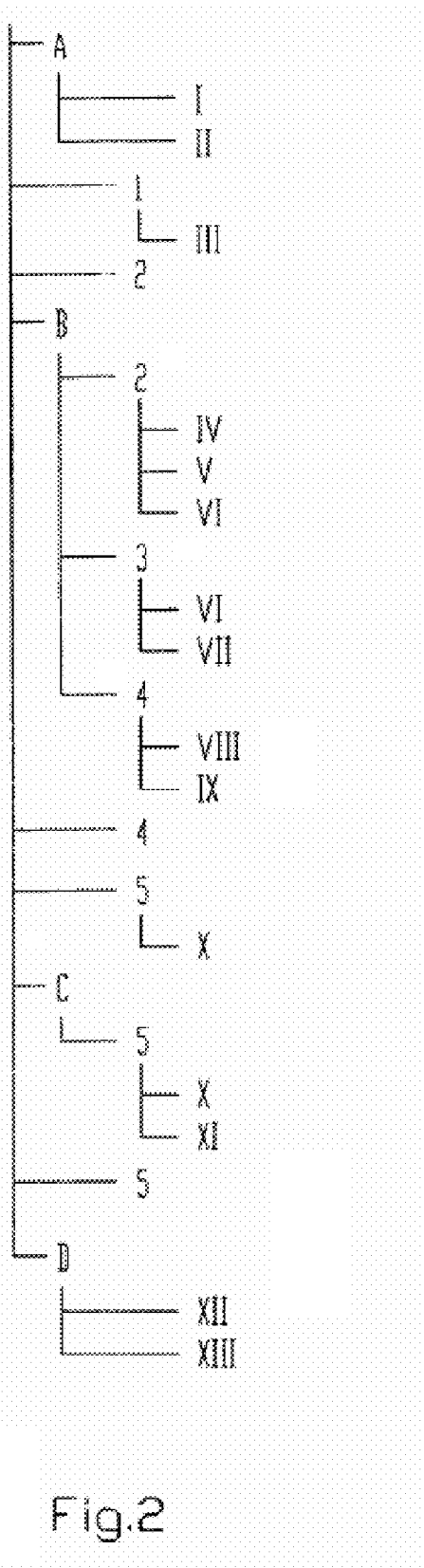
FIG. 2 shows a list of street names.
Figure 3:
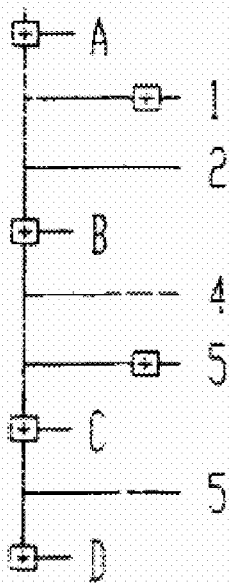
FIG. 3 shows a list of towns with overland road connections.
Figure 4:
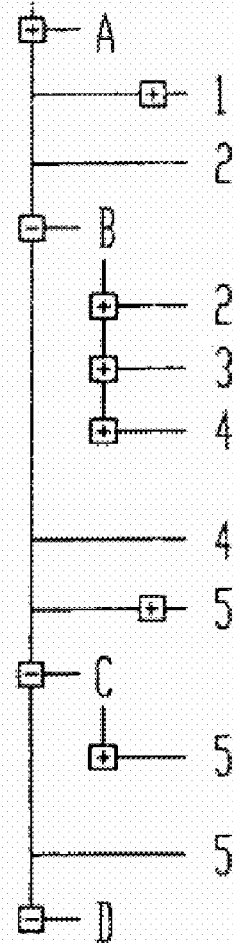
FIG. 4 shows a route list containing names of towns and street numbers.
Figure 5:
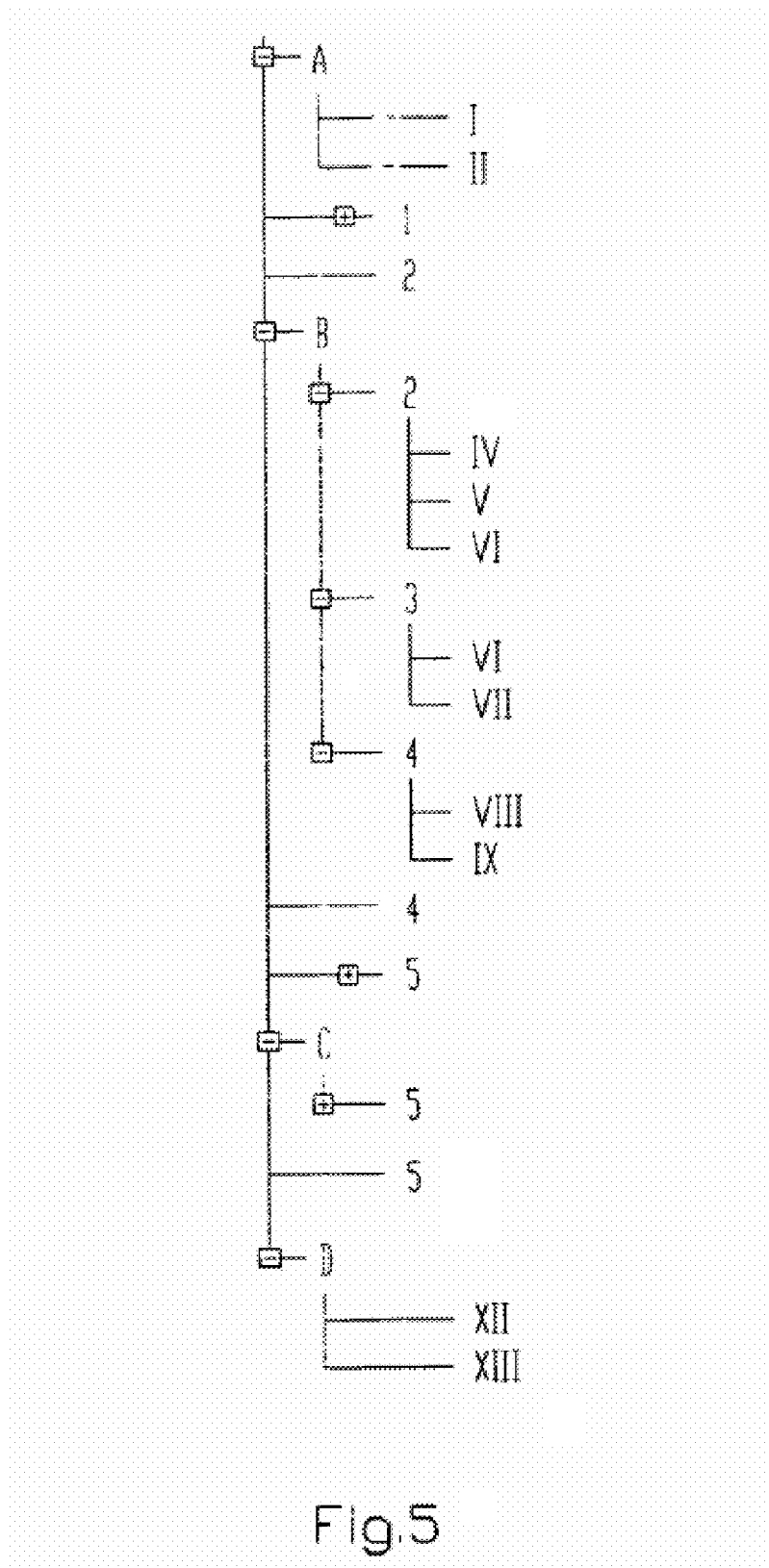
FIG. 5 shows a list of street names with partially expanded sublists.
Figure 6A:
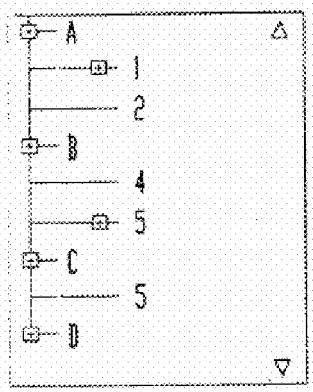
FIG. 6A shows a display of a list of towns with major streets in the display.
Figure 6B:
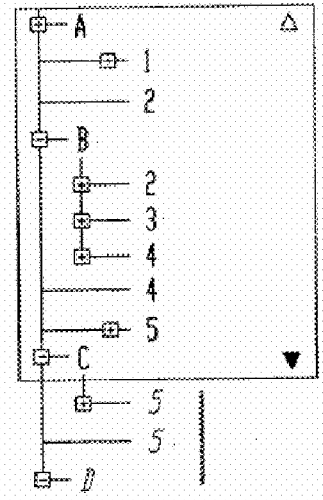
FIG. 6B shows the display from 6A with partially expanded sublists.
Figure 18A:
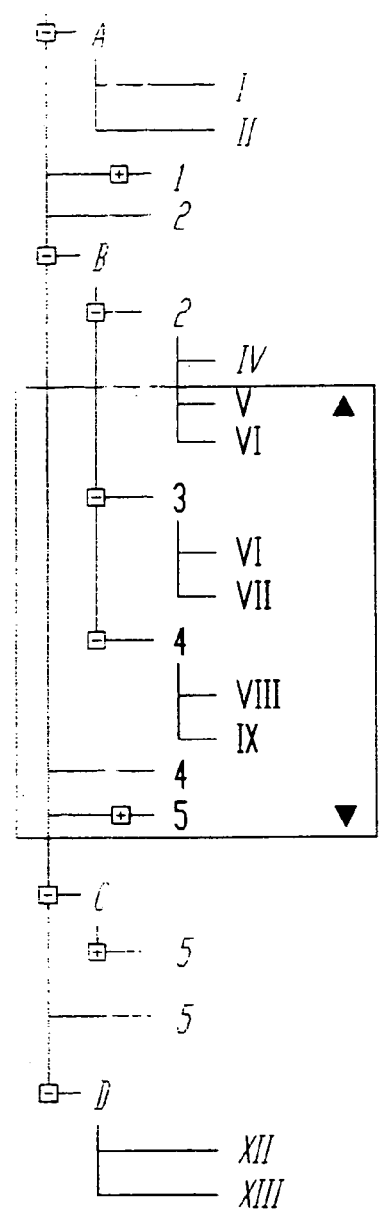
FIG. 18A shows a first form of display for sublists blanked out at the beginning.
Figure 18B:
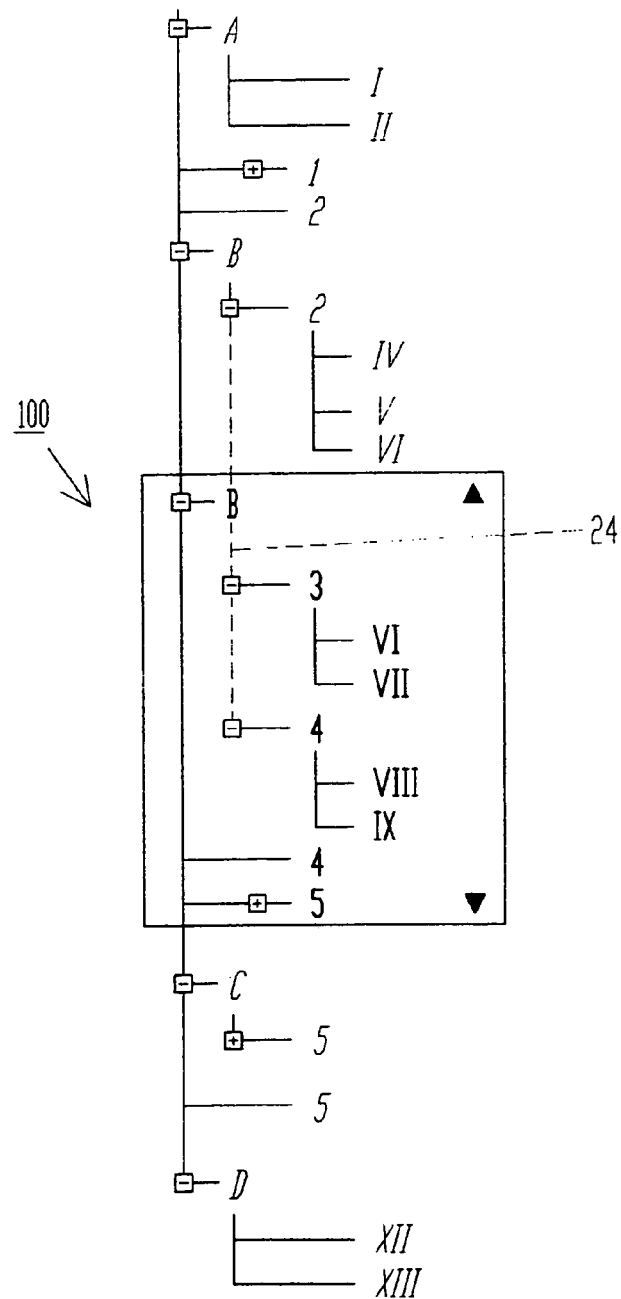
FIG. 18B shows a second form of display for sublists blanked out at the beginning.

With regard to the exemplary potential application forms of the present invention, the list of street names from FIG. 5 (repeated once again for purposes of comparison in FIG. 18A) is used as an example. An optimized display according to the teaching of the present invention is shown in FIG. 18B for this previously described example.

In this case, using interruption points 24, portions of the sublist for the second or middle hierarchical level (street numbers identified as Arabic numerals) are blanked out to allow the street names (=Roman numerals corresponding to the third or lower hierarchical level) and the street numbers (=Arabic numerals corresponding to the second or middle hierarchical level) to be associated with names of towns (letter B corresponding the first or upper hierarchical level).

Figure 19A:
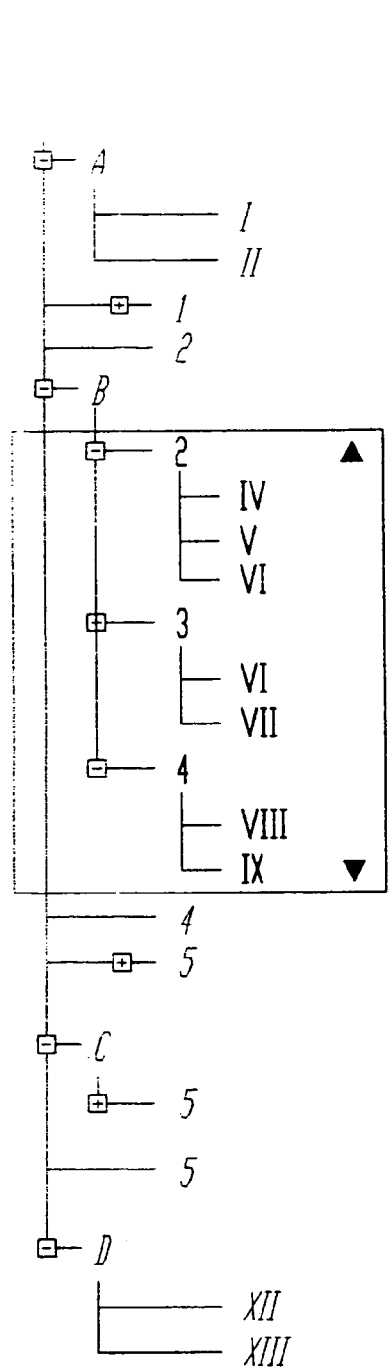
FIG. 19A shows the list of street names from FIG. 5 having blanked out elements of the list of street names.
Figure 19B:
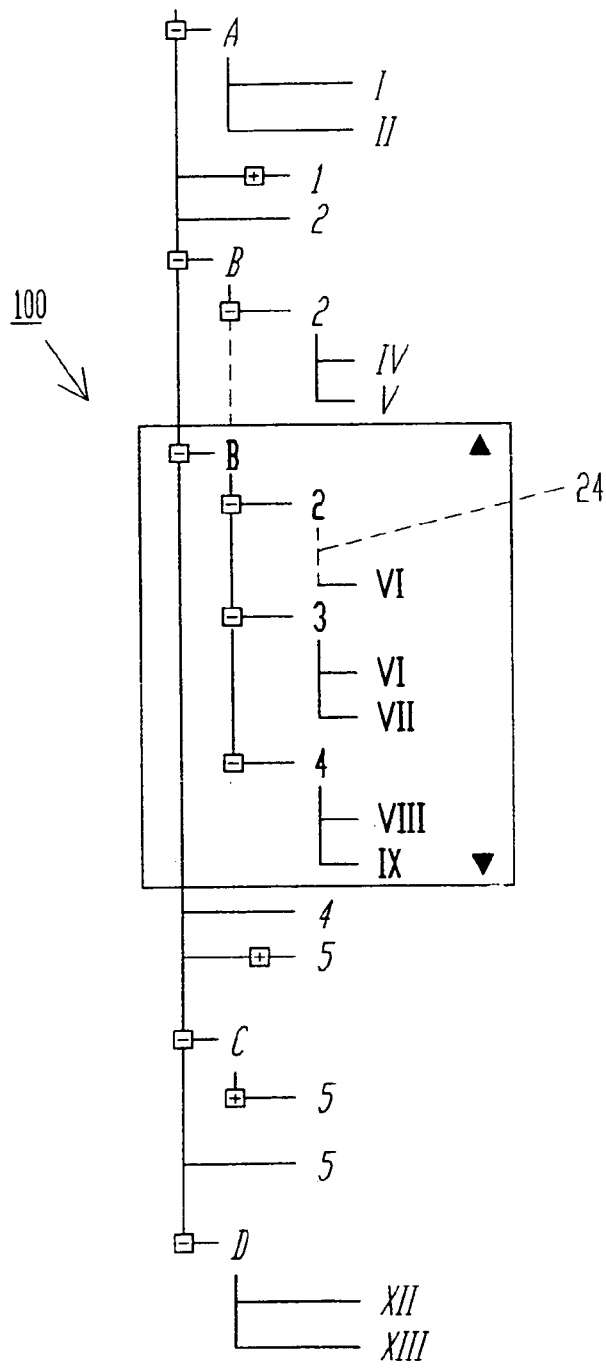
FIG. 19B shows the list of street names from FIG. 19A having the superordinate element displayed for each element of the displayed sublist.

In addition, in FIG. 19B portions of the sublist for the third or lower hierarchical level (street names identified as Roman numerals) are blanked out to allow the street names (=Roman numerals) to be associated with the street number (=Arabic numeral "2" corresponding to the second or middle hierarchical level).

Figures 8A, 8B:
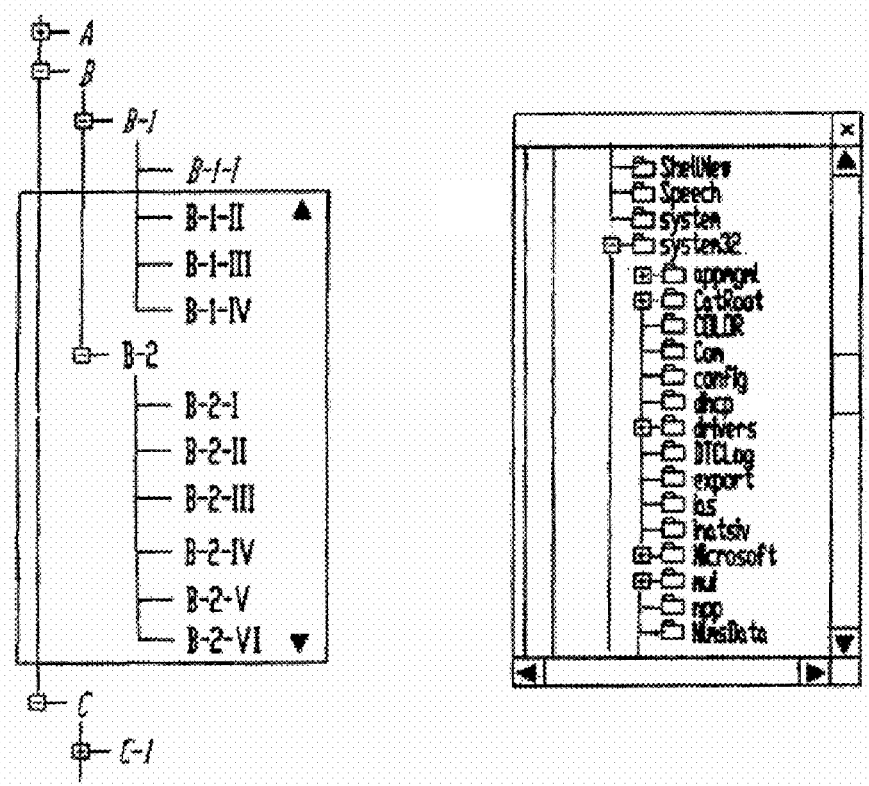
FIG. 8A shows a sublist without a detectable superordinate element (problem case).
FIG. 8B shows subdirectories for a file manager without detectable superordinate directories (problem case).
Figures 20A, 20B:
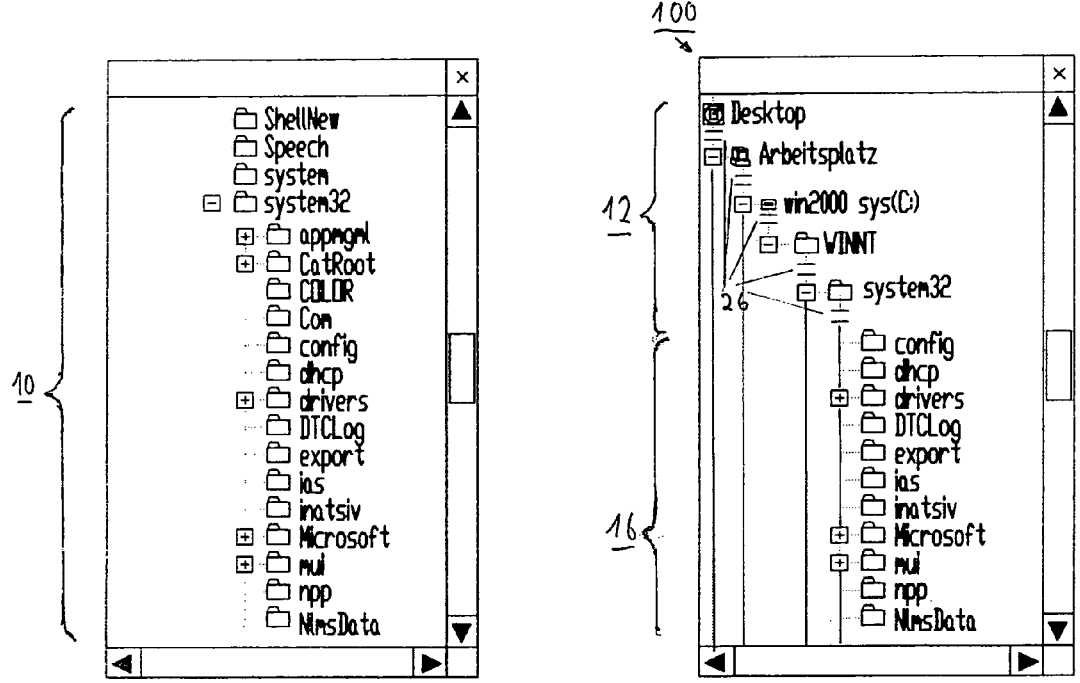
FIG. 20A shows the subdirectory list provided for a file manager from FIG. 8B, without identifiable superordinate directories.
FIG. 20B shows the subdirectory list from FIG. 20A having each superordinate directory displayed for each subdirectory.

Another example application form of the present invention is to be seen in the use for a display window of a file manager from FIG. 8B (repeated once again for purposes of comparison in FIG. 20A). The ability to associate directory "system32" to the superordinate directories without tedious scrolling is shown in the optimized display in FIG. 20B.

LIST OF REFERENCE NUMBERS

100 Display unit
10 Entire display region
12 First superordinate display region
14 Second superordinate display region
16 Subordinate display region
20 First separating and/or blanking element, in particular a first separating line
22 Second separating and/or blanking element, in particular a second separating line
24 Separating and/or blanking element, in particular an interruption point
26 Separating and/or blanking element, in particular an interruption line

What is claimed is:

1. A computer-implemented method for displaying at least one hierarchically structured list having at least two levels including at least one hierarchical level of superordinate elements and at least one hierarchical level of subordinate elements, at least one subordinate element being associated with at least one superordinate element, the method comprising:

(A) determining, by a computer processor, superordinate elements and subordinate elements to be displayed;

(B) subdividing, by the processor, a display region of a display device into at least one superordinate display region and at least one subordinate display region;

(C) displaying, by the processor, at least one subordinate element in the subordinate display region; and (D) displaying, in the superordinate display region and by the processor, a respective superordinate element associated with the displayed at least one subordinate element;

wherein the method step (A) for determining superordinate elements and subordinate elements to be displayed includes the following sub-steps:

[A.1] defining a current element as a last element in an original list to be displayed, and proceeding to step [A.2];

[A.2] checking whether an additional element is acceptable in the subordinate display region, wherein:

if an additional element is acceptable in the subordinate display region, then proceeding to step [A.3]; and if no additional element is acceptable in the subordinate display region, then proceeding to step [A.9];

[A.3] accepting the current element into the subordinate display region, and proceeding to step [A.4];

[A.4] checking whether the current element is also contained in the superordinate display region, wherein:

if the current element is also contained in the superordinate display region, then proceeding to step [A.5]; and if the current element is not also contained in the superordinate display region, then proceeding to step [A.6];

[A.5] deleting the current element from the superordinate display region, and proceeding to step [A.8];

[A.6] specifying the at least one superordinate element as the current element, and proceeding to step [A.7];

[A.7] accepting the at least one superordinate element specified in step [A.6] into the superordinate display region if the at least one superordinate element is not yet contained in the superordinate display region, and proceeding to step [A.8];

[A.8] defining the current element as the next element to be displayed in the original list, and proceeding to step [A.2]; and

[A.9] displaying the superordinate display region and the subordinate display region.

2. The method of claim 1, wherein a plurality of subordinate elements are associated with the respective superordinate element, and wherein at least one subordinate element is blanked out of the subordinate display region.

3. The method claim 2, wherein at least one subordinate element at the beginning of the subordinate display region is blanked out.

4. The method of claim 2, wherein a separating line separates the superordinate display region and the subordinate display region, the method further comprising:
shifting at least one of the separating line and a blanking element between the superordinate display region and the subordinate display region so that all superordinate elements associated with the displayed subordinate elements are displayed in the superordinate display region.

5. The method of claim 1, wherein a separating line separates the superordinate display region and the subordinate display region, the method further comprising:
shifting at least one of the separating line and a blanking element between the superordinate display region and the subordinate display region so that all superordinate elements associated with the displayed subordinate elements are displayed in the superordinate display region.

6. The method of claim 1, wherein at least one of:
the display device is of a cell phone;
the method is performed during execution of a software-based route search application of a navigation system; and
the method is performed during execution of a file manager application.

7. The method of claim 1, wherein the method is performed during execution of a software-based route search application of a navigation system installed in a vehicle.

8. The method of claim 1, wherein the at least one subordinate element and the respective superordinate element associated with the subordinate element are displayed in a display window of a file manager.

9. A computer-implemented method for displaying at least one hierarchically structured list having at least two levels including at least one hierarchical level of superordinate elements and at least one hierarchical level of subordinate elements, at least one subordinate element being associated with at least one superordinate element, the method comprising:
(A) determining, by a computer processor, superordinate elements and subordinate elements to be displayed;
(B) subdividing, by the processor, a display region of a display device into at least one superordinate display region and at least one subordinate display region; and
(C) displaying by the processor:
at least one subordinate element in the subordinate display region; and
in the superordinate display region, a respective superordinate element associated with the displayed at least one subordinate element;
wherein the method step (C) for displaying the at least one subordinate element and the respective superordinate element includes the following sub-steps:
[C.1] defining a current element as a first element of the superordinate display region to be displayed, and proceeding to step [C.2];
[C.2] displaying the current element, and proceeding to step [C.3];
[C.3] checking whether an additional element of the superordinate display region to be displayed is present, wherein:
if an additional element of the superordinate display region to be displayed is present, then proceeding to step [C.4]; and
if no additional element of the superordinate display region to be displayed is present, then proceeding to step [C.7];
[C.4] checking whether subsequent element of the superordinate display region corresponds to subsequent element of an original list, wherein:
if the subsequent element of the superordinate display region corresponds to the subsequent element of the original list, then proceeding to step [C.6]; and
if the subsequent element of the superordinate display region does not correspond to the subsequent element of the original list, then proceeding to step [C.5];
[C.5] displaying at least one separating line that separates the superordinate display region and the subordinate display region, and proceeding to step [C.6];
[C.6] defining the current element as the next element of the superordinate display region to be displayed, and proceeding to step [C.2];
[C.7] displaying the at least one separating line and proceeding to step [C.8]; and
[C.8] displaying the subordinate display region.

10. A cellular phone, comprising:
at least one display unit; and
a computer processor configured to display in the at least on display unit at least one hierarchically structured list having at least two levels including at least one hierarchical level of superordinate elements and at least one hierarchical level of subordinate elements, at least one subordinate element being associated with at least one superordinate element, by performing the following steps:
(A) determining superordinate elements and subordinate elements to be displayed;
(B) subdividing a display region of the at least one display unit into at least one superordinate display region and at least one subordinate display region; and
displaying at least one subordinate element in the subordinate display region, and displaying, in the superordinate display region, a respective superordinate element associated with the displayed at least one subordinate element;
wherein step (A) for determining superordinate elements and subordinate elements to be displayed includes the following sub-steps:
[A.1] defining a current element as a last element in an original list to be displayed, and proceeding to step [A.2];
[A.2] checking whether an additional element is acceptable in the subordinate display region, wherein:
if an additional element is acceptable in the subordinate display region, then proceeding to step [A.3]; and
if no additional element is acceptable in the subordinate display region, then proceeding to step [A.9];
[A.3] accepting the current element into the subordinate display region, and proceeding to step [A.4];
[A.4] checking whether the current element is also contained in the superordinate display region, wherein:
if the current element is also contained in the superordinate display region, then proceeding to step [A.5]; and
if the current element is not also contained in the superordinate display region, then proceeding to step [A.6];
[A.5] deleting the current element from the superordinate display region, and proceeding to step [A.8];

[A.6] specifying the at least one superordinate element as the current element, and proceeding to step [A.7];

[A.7] accepting the at least one superordinate element specified in step [A.6] into the superordinate display region if the at least one superordinate element is not yet contained in the superordinate display region, and proceeding to step [A.8];

[A.8] defining the current element as the next element to be displayed in the original list, and proceeding to step [A.2] and

[A.9] displaying the superordinate display region and the subordinate display region.

11. The cellular phone of claim 10, wherein step (C) for displaying the at least one subordinate element and the respective superordinate element includes the following sub-steps:

[C.1] defining the current element as a first element of the superordinate display region to be displayed, and proceeding to step [C.2];

[C.2] displaying the current element, and proceeding to step [C.3];

[C.3] checking whether an additional element of the superordinate display region to be displayed is present, wherein:

if an additional element of the superordinate display region to be displayed is present, then proceeding to step [C.4]; and if no additional element of the superordinate display region to be displayed is present, then proceeding to step [C.7];

[C.4] checking whether a subsequent element of the superordinate display region corresponds to a subsequent element of the original list, wherein:

if the subsequent element of the superordinate display region corresponds to the subsequent element of the original list, then proceeding to step [C.6]; and if the subsequent element of the superordinate display region does not correspond to the subsequent element of the original list, then proceeding to step [C.5];

[C.5] displaying at least one separating line that separates the superordinate display region and the subordinate display region, and proceeding to step [C.6];

[C.6] defining the current element as the next element of the superordinate display region to be displayed, and proceeding to step [C.2];

[C.7] displaying the at least one separating line and proceeding to step [C.8]; and

[C.8] displaying the subordinate display region.

12. A navigation system, comprising:

at least one display unit; and a computer processor configured to display in the at least on display unit at least one hierarchically structured list having at least two levels including at least one hierarchical level of superordinate elements and at least one hierarchical level of subordinate elements, at least one subordinate element being associated with at least one superordinate element, by performing the following steps:

(A) determining superordinate elements and subordinate elements to be displayed;

(B) subdividing a display region of the at least one display unit into at least one superordinate display region and at least one subordinate display region; and (C) displaying at least one subordinate element in the subordinate display region, and displaying, in the superordinate display region, a respective superordinate element associated with the displayed at least one subordinate element;

wherein step (A) for determining superordinate elements and subordinate elements to be displayed includes the following sub-steps:

[A.1] defining a current element as a last element in an original list to be displayed, and proceeding to step [A.2];

[A.2] checking whether an additional element is acceptable in the subordinate display region, wherein:

if an additional element is acceptable in the subordinate display region, then proceeding to step [A.3]; and if no additional element is acceptable in the subordinate display region, then proceeding to step [A.9];

[A.3] accepting the current element into the subordinate display region, and proceeding to step [A.4];

[A.4] checking whether the current element is also contained in the superordinate display region, wherein:

if the current element is also contained in the superordinate display region, then proceeding to step [A.5]; and if the current element is not also contained in the superordinate display region, then proceeding to step [A.6];

[A.5] deleting the current element from the superordinate display region, and proceeding to step [A.8];

[A.6] specifying the at least one superordinate element as the current element, and proceeding to step [A.7];

[A.7] accepting the at least one superordinate element specified in step [A.6] into the superordinate display region if the at least one superordinate element is not yet contained in the superordinate display region, and proceeding to step [A.8];

[A.8] defining the current element as the next element to be displayed in the original list, and proceeding to step [A.2]; and

[A.9] displaying the superordinate display region and the subordinate display region.

13. The navigation system of claim 12, wherein step (C) for displaying the at least one subordinate element and the respective superordinate element includes the following sub-steps:

[C.1] defining the current element as a first element of the superordinate display region to be displayed, and proceeding to step [C.2];

[C.2] displaying the current element, and proceeding to step [C.3];

[C.3] checking whether an additional element of the superordinate display region to be displayed is present, wherein:

if an additional element of the superordinate display region to be displayed is present, then proceeding to step [C.4]; and if no additional element of the superordinate display region to be displayed is present, then proceeding to step [C.7];

[C.4] checking whether a subsequent element of the superordinate display region corresponds to a subsequent element of the original list, wherein:

if the subsequent element of the superordinate display region corresponds to the subsequent element of the original list, then proceeding to step [C.6]; and if the subsequent element of the superordinate display region does not correspond to the subsequent element of the original list, then proceeding to step [C.5];

[C.5] displaying at least one separating line that separates the superordinate display region and the subordinate display region, and proceeding to step [C.6];

[C.6] defining the current element as the next element of the superordinate display region to be displayed, and proceeding to step [C.2];

[C.7] displaying the at least one separating line and proceeding to step [C.8]; and

[C.8] displaying the subordinate display region.

14. A computer-readable storage medium having stored thereon instructions executable by a processor, the instructions which when executed cause the processor to perform a method for displaying at least one hierarchically structured list having at least two levels including at least one hierarchical level of superordinate elements and at least one hierarchical level of subordinate elements, at least one subordinate element being associated with at least one superordinate element, the method comprising:

(A) determining superordinate elements and subordinate elements to be displayed;

(B) subdividing a display region into at least one superordinate display region and at least one subordinate display region; and (C) displaying at least one subordinate element in the subordinate display region, and displaying, in the superordinate display region, a respective superordinate element associated with the displayed at least one subordinate element;

wherein step (A) for determining superordinate elements and subordinate elements to be displayed includes the following sub-steps:

[A.1] defining a current element as a last element in an original list to be displayed, and proceeding to step [A.2];

[A.2] checking whether an additional element is acceptable in the subordinate display region, wherein:
if an additional element is acceptable in the subordinate display region, then proceeding to step [A.3]; and
if no additional element is acceptable in the subordinate display region, then proceeding to step [A.9];

[A.3] accepting the current element into the subordinate display region, and proceeding to step [A.4];

[A.4] checking whether the current element is also contained in the superordinate display region, wherein:
if the current element is also contained in the superordinate display region, then proceeding to step [A.5]; and
if the current element is not also contained in the superordinate display region, then proceeding to step [A.6];

[A.5] deleting the current element from the superordinate display region, and proceeding to step [A.8];

[A.6] specifying the at least one superordinate element as the current element, and proceeding to step [A.7];

[A.7] accepting the at least one superordinate element specified in step [A.6] into the superordinate display region if the at least one superordinate element is not yet contained in the superordinate display region, and proceeding to step [A.8];

[A.8] defining the current element as the next element to be displayed in the original list, and proceeding to step [A.2]; and

[A.9] displaying the superordinate display region and the subordinate display region.

15. The computer-readable storage medium of claim 14, wherein the method further comprises providing in the display region at least one of a separating element and a blanking element configured to be shifted between the superordinate display region and the subordinate display region so that all superordinate elements associated with subordinate elements are displayed in the superordinate display region.

16. The computer-readable storage medium of claim 14, wherein the respective superordinate element associated with the displayed at least one subordinate element is displayed in a smaller typeface than the at least one subordinate element.

17. The computer-readable storage medium of claim 14, wherein step (C) for displaying the at least one subordinate element and the respective superordinate element includes the following sub-steps:

[C.1] defining the current element as a first element of the superordinate display region to be displayed, and proceeding to step [C.2];

[C.2] displaying the current element, and proceeding to step [C.3];

[C.3] checking whether an additional element of the superordinate display region to be displayed is present, wherein:
if an additional element of the superordinate display region to be displayed is present, then proceeding to step [C.4]; and
if no additional element of the superordinate display region to be displayed is present, then proceeding to step [C.7];

[C.4] checking whether a subsequent element of the superordinate display region corresponds to a subsequent element of the original list, wherein:
if the subsequent element of the superordinate display region corresponds to the subsequent element of the original list, then proceeding to step [C.6]; and
if the subsequent element of the superordinate display region does not correspond to the subsequent element of the original list, then proceeding to step [C.5];

[C.5] displaying at least one separating line that separates the superordinate display region and the subordinate display region, and proceeding to step [C.6];

[C.6] defining the current element as the next element of the superordinate display region to be displayed, and proceeding to step [C.2];

[C.7] displaying the at least one separating line and proceeding to step [C.8]; and

[C.8] displaying the subordinate display region.

* * * * *